May 8, 1934.   J. A. OLSON   1,958,246
SHAFT PACKING
Filed July 17, 1930   2 Sheets-Sheet 1
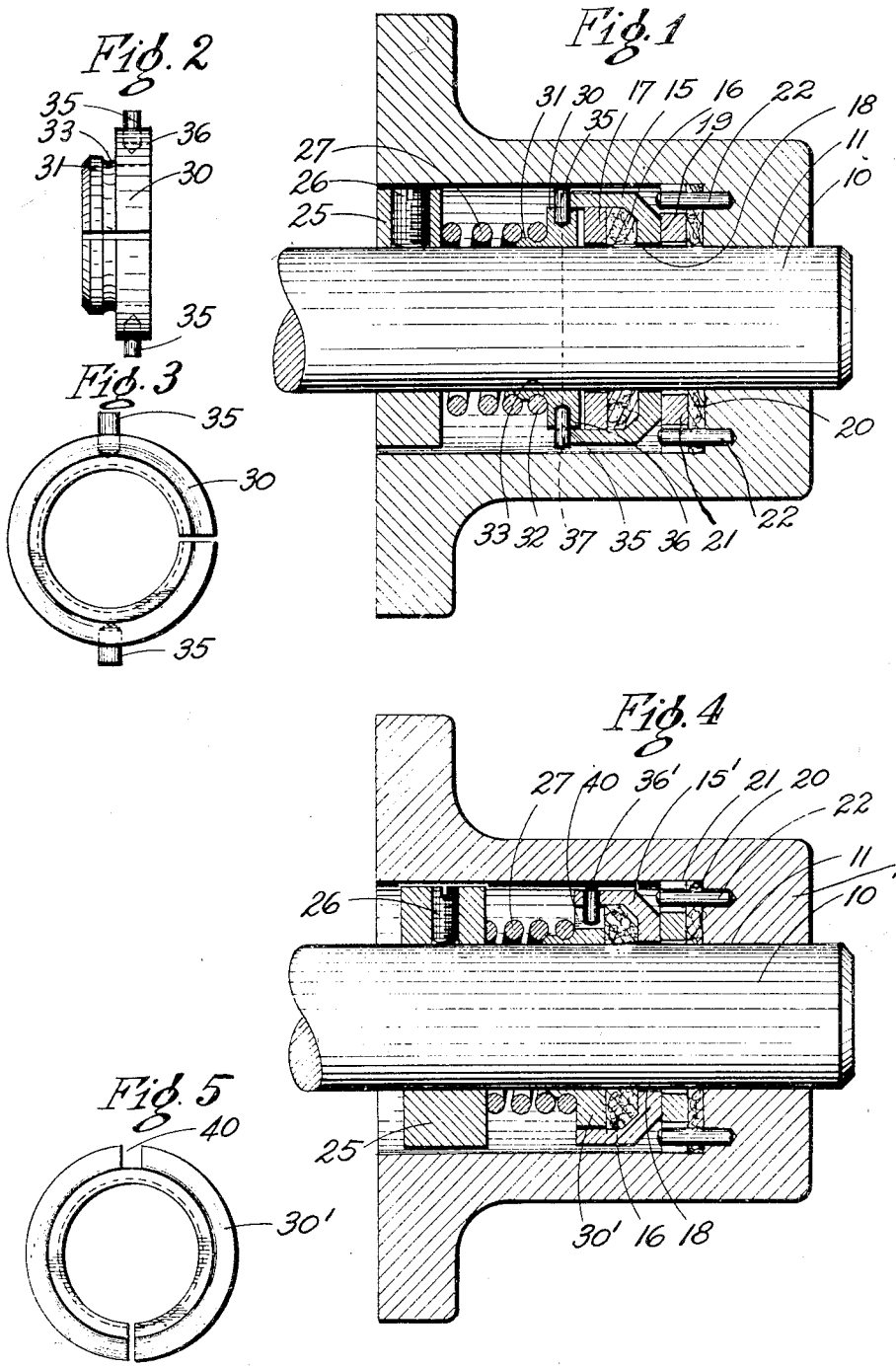
Inventor
JOHN A. OLSON
By Ricky & Watts
Attorneys May 8, 1934.  J. A. OLSON  1,958,246
SHAFT PACKING
Filed July 17, 1930　　2 Sheets-Sheet 2
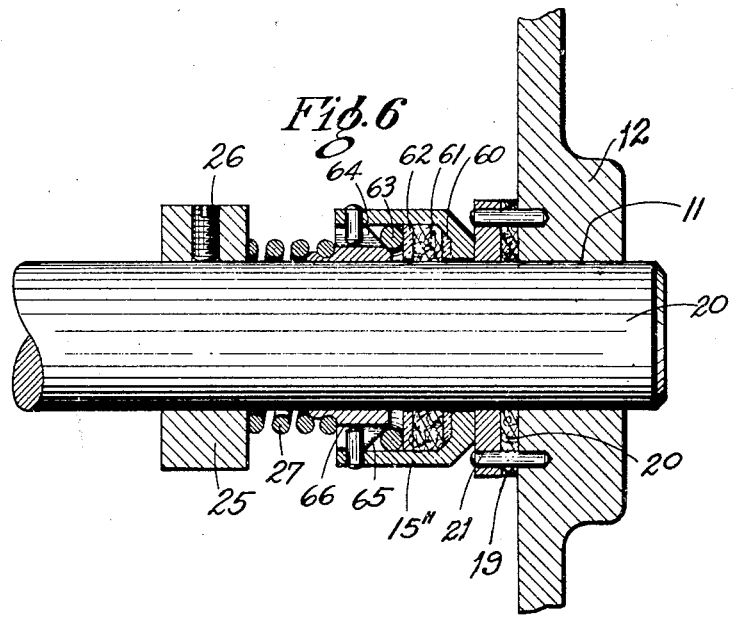
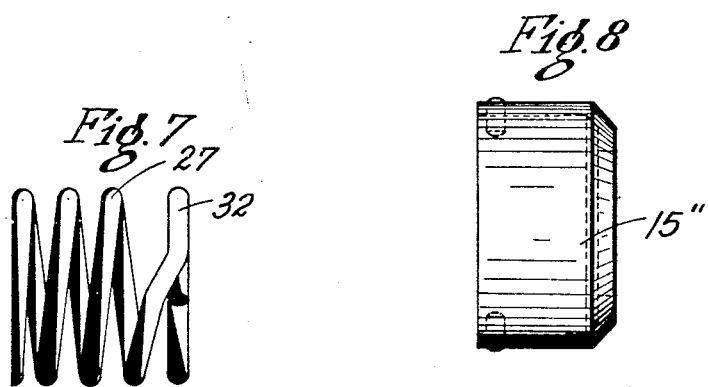
Inventor
JOHN A. OLSON
By Rickey & Watts
Attorneys Patented May 8, 1934

1,958,246

UNITED STATES PATENT OFFICE 1,958,246

SHAFT PACKING

John A. Olson, Cleveland, Ohio

Application July 17, 1930, Serial No. 468,591

4 Claims. (Cl. 286—7)

This invention relates to fluid seals or packings and is more particularly concerned with a fluid seal for preventing the escape of fluid between a rotary shaft and a casing.

It has always been a difficult problem to prevent escape of fluid around the bearings or where a rotating shaft passes through the casing of machines such as elastic fluid turbines, two cycle internal combustion engines, fluid compressors and the like. It is an object therefore, of the present invention to provide a packing or sealing means between the shaft and casing which eliminates the possibility of leakage therebetween.

It is another object of this invention, by the sealing means that is adjustable of itself, to compensate for variances in the position of the shaft with respect to its bearings so that a fluid tight seal may be maintained at all times.

Another object is to provide a sealing means of the class described which is simple in construction, economic to manufacture and effective in operation.

Other objects and advantages more or less ancillary to the foregoing and the invention itself and the manner in which the various objects are realized reside in the specific construction of the elements peculiar to this structure, and will become apparent from a more complete examination of this specification.

In the accompanying drawings there are disclosed several embodiments of the invention, in which Fig. 1 is a longitudinal sectional view of a shaft and a casing with packing applied thereto;

Figs. 2 and 3 are side and end elevational views respectively, of a collet which forms a part of the invention;

Fig. 4 is a longitudinal sectional view of a modification of the invention;

Fig. 5 is an end elevational view of a modified form of collet used in the embodiment of Fig. 4;

Fig. 6 is a longitudinal sectional view of another embodiment of the invention;

Fig. 7 is an elevational view of a spring used in the invention;

Fig. 8 is an elevational view of a cup used in the invention.

Referring now to the drawings throughout which like parts are designated by like reference characters, there is illustrated a portion of a housing or casing which comprises a hollow cylindrical boss through which a rotatable shaft extends and it is desired to provide a fluid tight seal between the shaft and the casing.

The rotatable shaft 10 projects through an aperture 11 in the end wall 12 of the housing.

The seal between the shaft and the housing comprises generally a sealing means carried by the shaft and adapted to seat against the end wall to prevent the passage of fluid. More specifically one form of sealing means is illustrated in Fig. 1. A cup shaped ring 15 is disposed about the shaft and a packing 16 is seated within the cup being held therein under slight pressure by a ring 17 which is pressed into the cup against the packing forcing the packing securely within the cup and around the shaft furnishing a fluid tight seal between the cup and the shaft. A slight clearance 18 is provided between the cup and the shaft which permits relative movement of the cup with respect to the shaft.

The end wall 19' of the cup may be square ground and is adapted to be resiliently pressed against a seat mounted in spaced relation from the inner side of the radial wall of the casing. In the embodiments shown the end wall of the housing has been provided with a seat for the cup which comprises a resilient washer 20 spacing the seat 21 from the end wall. Rotation of the seat relative to the casing is prevented by pins 22 which extend through the seat and washer into the end wall. The seat may adjust itself to the plane of the cup face due to the resiliency of the washer 20 which permits the seat to tilt relative to the wall of the housing.

As previously stated the cup together with the packing is adapted to be pressed against the end wall or seat of the housing. The packing which seals the cup and shaft against fluid leakage therebetween also permits the cup to move laterally relative to the shaft. The face 19' of the cup is pressed into contact with the seat 21, sealing the shaft and the cup against fluid leakage past the cup.

The cup 15 is resiliently urged toward its seat by virtue of the coiled spring 27 encompassing the shaft and abutting at one end against a collar 25 spaced from the cup member and secured to the shaft by a set screw 26. At the other end, the spring encompasses a split collar 30, Figures 2 and 3, having a radial part coupled with the cup by means of pins 35 that seat in notches 37 in the margin of the cup. The spring is effective to clamp the collar to the shaft and is inseparably joined thereto by virtue of the grooved portion 33 which affords a shoulder 31 over which the end convolution of the spring can not ride.

It is to be noted that all driving strain which rotates the cup with the shaft is transmitted through the flange 25, the spring 27, the collet 30 to the cup 15. No tortional strain is transmitted from the shaft through the packing 16 to the cup. This in effect allows the packing to provide a more efficient fluid seal between the shaft and the cup.

The cup being capable of a lateral or tilting movement, may readily conform to the plane of the seat 21, effecting an efficient and long lived fluid seal, at the same time any wobbling movement that may take place will not effect the efficiency of the fluid seal. The packing may be tightened at any time by driving the ring 17 further into the cup.

In Fig. 4 another embodiment of the invention has been illustrated in which the ring 17 has been eliminated and the packing is pressed into the cup 15' by a collet 30'. In other respects the embodiment is substantially the same and comprises a seat 22 for the end wall 12 against which the cup 15' is adapted to be pressed in sealing engagement. The collet 30' is telescoped into the cup and is pressed against the packing 15 to hold the same into fluid tight engagement with the cup and the shaft 10. The cup is driven by the collet, being coupled thereto by a pin 36' which is carried by the cup and extends into a notch 40 of the collet. The pins of the collet do not seat in the notches as in the previous embodiment and the longitudinal pressure necessary to cause the cup to seat is transmitted through the packing to the cup.

The spring 27 which bears against the flange 25 urges the collet into the cup against the packing holding the packing into the cup in fluid tight engagement with the cup and shaft. The friction of the ends of the spring with the flange 25 and the collet together with the gripping action of the collet upon the shaft as previously described, drives the collet, which in turn drives the cup through the pin 36'.

Another embodiment of the invention is illustrated in Fig. 6, and is differentiated from the other embodiments by the manner of connection between the collet, and the packing and the cup. A fibre washer 60 may be disposed in the end of the cup and a resilient packing 61 is disposed in the cup adjacent to the washer. Another fibre washer 62 is disposed on the other side of the packing toward the collet.

A ring 63 is disposed adjacent the last fibre washer. The collet is provided with a beveled or frusto-conical face 64. The slanting face 64 rests against the ring 63 and is adapted to seat on the ring 63 so as to allow a relatively free lateral movement between the collet and the ring. The ring is pressed by the collet securely against the fibre washer compressing the packing.

The flange 66 of the collet is notched or slotted at 65 and pins 67 which are carried by the cup 15" extend into the notches. The flange 25 and spring 27 are coupled to the collet in a similar manner as described for the previous embodiments.

In operation the helical spring 27, Fig. 7, which abuts the flange 25 and encircles the tubular extension of the collet, presses the collet against the ring 63, which in turn presses the packing 61 between the fibre washers 60 and 62 into fluid tight engagement between the shaft and the cup. The drive between the collet and the cup is maintained by the pins 67 carried by the cup which extend into the notches 65 of the cup.

It may readily be seen that the face 64 of the collet might be a concave face as well as a flat face. The frusto-conical shape of the face shown allows the cup to tilt or wobble relative to the collet, at the same time maintaining from the collet, an equal pressure against the ring and the packing. The packings shown may be of any suitable substance impervious to the fluid to be excluded.

It is to be observed that clearance is afforded between the cup 15 and the shaft and that during ordinary conditions of operation, the bore in the cup is substantially co-axial with the longitudinal axis of the shaft. The seat 21, however, is preferably co-axial with the bore in the casing and is afforded a slight tilting movement as distinguished from the oscillating movement of the cup shaped member, relative to the shaft by virtue of the clearance that exists between the member and casing, the member and the pins that support it, and the resilient backing that spaces it from the end wall. Hence, the cup 15 and the seating member 21 are possessed of limited movement in a plane substantially normal to the longitudinal axis of the shaft so that the seat may adjust itself to the plane of the cup face.

With a packing constructed as is shown in Fig. 6 the undesirable effect of a spring which has more resiliency at one point than at another about its circumference, is substantially eliminated. This materially assists in providing more equal pressure to all parts of the packing and the cup by the transmission of the pressure through the frustro-conical face of the collet and the ring, and allows the cup to seat itself evenly against the end wall.

Having thus described my invention, I am aware that numerous and extensive departures may be made therefrom but without departing from the scope of the appended claims.

I claim:

1. The combination with a rotatable shaft and a wall through which it extends, of a sealing means comprising a cup-shaped sealing ring surrounding the shaft, spring means for urging said ring against the wall to provide a fluid tight joint therebetween, packing in the cup-shaped sealing ring providing a fluid tight joint between the ring and the shaft and a split collet secured to the shaft by the spring and to the sealing ring for causing rotation of the latter with the shaft.

2. The combination with a rotatable shaft and a wall through which it extends, of a sealing means comprising a cup-shaped sealing ring surrounding the shaft, spring means for urging the ring against the wall to provide a fluid tight joint therebetween, packing in the cup-shaped sealing ring, means in the ring for urging the packing against the shaft and a split collet secured to the shaft by the spring and to the sealing ring for causing rotation of the latter with the shaft.

3. The combination with a rotatable shaft and a wall through which it extends, of a sealing means comprising a cup-shaped sealing ring surrounding the shaft, resilient means secured to the shaft for urging the ring against the wall to provide a fluid tight joint therebetween, packing material in the cup-shaped sealing ring, means for compressing the packing between the shaft and the cup-shaped ring to provide a fluid tight joint therebetween and a split collet secured to the shaft by the resilient means and operatively associated with the ring for causing rotation of the latter with the shaft.

4. In combination with a rotary shaft and a housing through which the shaft extends, a rotary shaft packing including a member rotatable with the shaft and adapted to be seated against the housing wall about the shaft, means to drive said member including a flange carried by the shaft, a spring bearing against the flange, a collet, carried by the shaft and connected to the spring said collet having a tapered face adapted to extend into said rotatable member and a ring spacing the collet from the member said collet bearing against the ring said ring allowing the member to tilt freely relative to the collet, and driving means between the collet and the member.

JOHN A. OLSON.